Nov. 7, 1950      W. L. NORTHRUP      2,529,411
GASKET FOR REPAIRING WELD AND PIT LEAKS ON PIPES
Filed Dec. 7, 1945
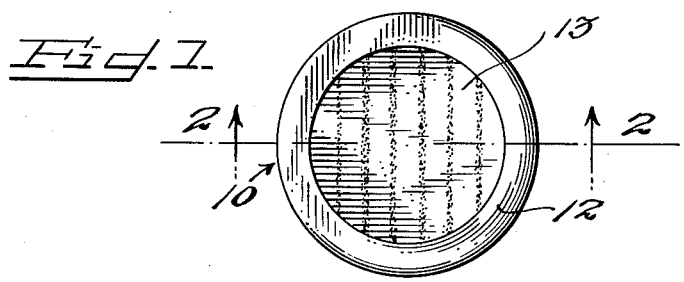
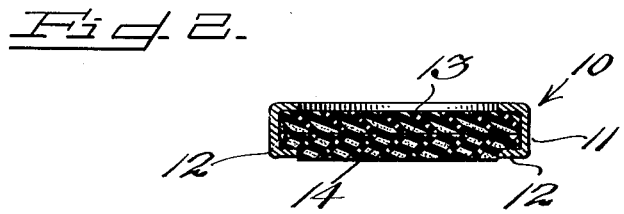
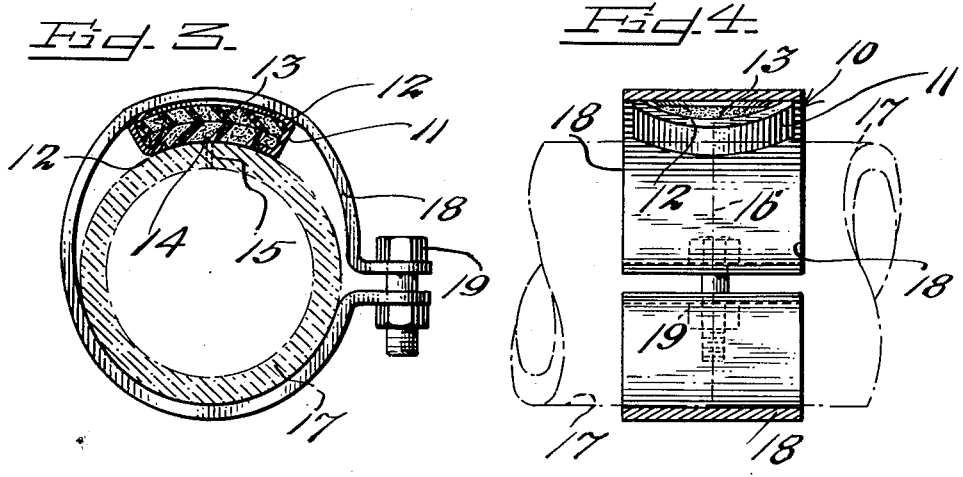
Inventor
WEAVER LAMONT NORTHRUP,
By Clarence A. O'Brien
and Harvey B. Jacobson
Attorneys Patented Nov. 7, 1950

2,529,411

UNITED STATES PATENT OFFICE 2,529,411

GASKET FOR REPAIRING WELD AND PIT LEAKS ON PIPES

Weaver Lamont Northrup, Elm Creek, Nebr., assignor of one-third to Leonard C. Hill, Hastings, Nebr.

Application December 7, 1945, Serial No. 633,437

4 Claims. (Cl. 138—99)

My invention pertains to gaskets for repairing leaks in pipe lines and more particularly at welds or in pits as well as pipe leaks in general.

For this purpose a pliable gasket is provided for placing over the leak in a pipe line and bending the gasket to conform with the curvature of the pipe surface and clamping it fast thereon.

The advantages of this invention will be readily understood from the following description with the aid of the drawing illustrating one embodiment of the invention and wherein the same details are given the same reference characters in the different figures.

Figure 1 is a top plan view of the gasket;

Figure 2 is a diametrical section along line 2—2 of Figure 1;

Figure 3 is a transverse section on the weld lines of a pipe with the gasket applied over a leak and Figure 4 is a side view of Figure 3.

In the drawing the gasket is shown as a circular disk, but may have any other ring shape such as oval or elliptical, constructed on two axes of different lengths. It is composed of three or more elements of which the outermost or casing 10 is a ring of U-shaped cross section with an intermediate, peripheral wall 11, with inturned flanges 12. Between these flanges are held the other two parts consisting of solid disks 13 and 14 filling the entire opening of the casing 10. The upper disk 13 is made of plastic or textile, medium soft gasket material, while the second or bottom disk 14 is made of soft raw rubber material.

The casing ring 10, however, is made of a soft and pliable metal. In most cases lead is used as best suitable for the purpose, but at times soft copper is preferred.

For the upper disk 13 the best material has been found to be medium soft red gasket rubber and for disk 14 raw gum rubber is generally used.

Figures 3 and 4 indicate the application of the gasket over a leak at 15 in the weld line 16 of a pair of pipes 17. As shown the gasket is placed right over the leak and bent and pressed down an equal amount on each side of the opening and so as to closely conform to the round surface of the pipes 17 or other structure where applied. In this condition the gasket is firmly secured over the weld by means of a clamping band 18 slipped over the pipes and the gasket and tightened by a clamp screw and nut 19.

The grades of the gasket material may be varied as to composition or softness to suit different uses. The shape and size of the gasket also may be modified as best suitable for the structure for which the gasket is intended.

It is to be understood that the invention as here disclosed is not limited to the details here described and shown but that the same may be varied widely without departing from the spirit of the invention as defined by the subjoined claims.

I claim:

1. In a device for repairing pipes including an adjustable pipe clamp and means for sealing leaks in pipes, the improvement which comprises: malleable flat plate having a wall extending therefrom at substantially right angles, and a flange extending from said wall substantially parallel to said plate for engaging irregular surfaces of a pipe, sheets of material having varied resiliency retained within said flange and a portion of one of said sheets extending outwardly of said flange.

2. In a device for repairing pipes including an adjustable pipe clamp and means for engaging and sealing pipe leaks, the improvement which comprises: a malleable housing including a plate having a wall extending therefrom and an angularly disposed flange projecting from said wall for engaging irregular surfaces of a pipe thereby deforming to follow the contour thereof to inhibit creeping, a sheet of resilient material within said wall, a second sheet of material retained within said wall and engaging said flange.

3. The invention recited in claim 2, said second sheet being soft relative to said first sheet.

4. For use in a pipe leak repair device, a housing consisting of a flat plate of malleable material and having a marginal edge, a continuous wall disposed at right angles to said plate and fixed thereto, a continuous flange disposed at the free edge of said wall and extending substantially parallel to said plate, said wall and said flange being composed of malleable material, and a flexible material filler disposed within said continuous wall and supported by said flange adapted to be disposed on a defective portion of a pipe.

WEAVER LAMONT NORTHRUP.

REFERENCES CITED

The following references are of record in the file of this patent:

UNITED STATES PATENTS

| Number | Name | Date |
|---|---|---|
| 524,162 | Cochrane | Aug. 7, 1894 |
| 573,491 | Smith | Dec. 22, 1896 |
| 785,737 | Jones | Mar. 28, 1905 |
| 1,064,022 | Spadone | June 10, 1913 |
| 1,312,338 | Mosler | Aug. 5, 1919 |
| 1,782,014 | Rimmelspacher | Nov. 18, 1930 |
| 2,081,040 | King | May 18, 1937 |